3,532,695
MORPHOLINOISONICOTINAMIDES
William Dvonch, 75 Ivywood Lane, Radnor, Pa. 15010,
and Harvey E. Alburn, 1420 Carroll Brown Way, West
Chester, Pa. 19013
No Drawing. Continuation-in-part of applications Ser. No.
392,920, Aug. 28, 1964, and Ser. No. 589,820, Oct. 27,
1966. This application Oct. 25, 1967, Ser. No. 677,882
Int. Cl. C07d 87/24, 87/38
U.S. Cl. 260—247.2
1 Claim

ABSTRACT OF THE DISCLOSURE

This invention is concerned with isonicotinic acid hydrazide derivatives of periodate oxidized purine ribosides. Further, this invention is concerned with the preparation of these derivatives by the interaction of a periodate oxidation product of a purine riboside with an isonicotinic acid hydrazide. These compounds possess anti-influenza properties.

---

This is a continuation-in-part of U.S. Ser. No. 392,920, filed on Aug. 28, 1964, now abandoned, and Ser. No. 589,820, filed Oct. 27, 1966 now abandoned.

This invention relates to new isonicotinic acid hydrazides and more particularly to isonicotinic acid hydrazide derivatives of a periodate oxidized purine riboside and to the method by which these novel compounds are prepared.

The new compounds of the present invention considered in their broadest aspect include those encompassed within the following formula:

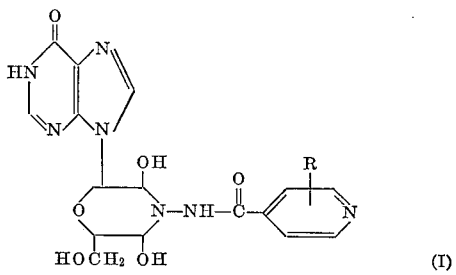

wherein R is selected from the group consisting of hydrogen and lower alkyl having up to four carbons.

The new compounds of this invention may be prepared by the treatment of a periodate oxidized purine riboside with isonicotinic acid hydrazides according to the following reaction sequence:

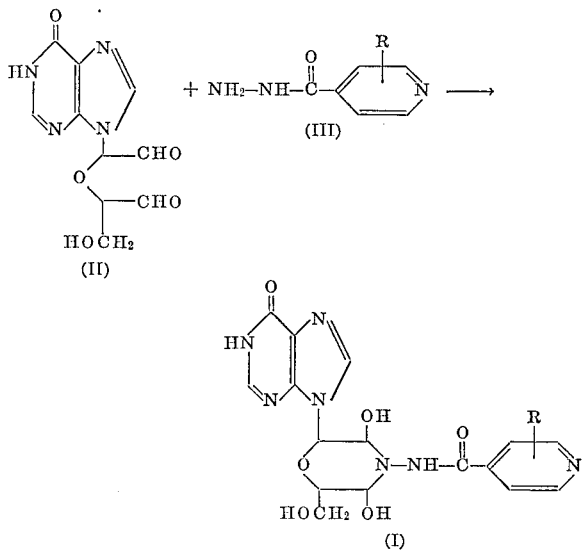

wherein R is defined as above. In carrying out the foregoing reaction, the appropriate periodate oxidation product (II) in an inert solvent such as water, dioxane, dimethylformamide, or the like is treated with an equimolar amount of isonicotinic acid hydrazide (III) or an alkyl derivative thereof. The reaction mixture is allowed to stand for a period of from one to about ten hours after which time crystals begin to form. The crystalline product (I) is then filtered off, washed and dried in a conventional manner. The product may be recrystallized if desired.

To prepare the periodate oxidation product used in the process of this invention two to six moles of periodic acid in an aqueous solution are added to one mole of an appropriate purine riboside. The reaction is then conducted at a temperature of from 5° C. to about 35° C., in the absence of light, for a period of from ten minutes to about fifty hours. The oxidation reaction normally proceeds smoothly. Recovery of the product may be accomplished as follows. The solution remaining after the oxidation step is passed over a Dowex-1-acetate column and the column washed with water. The iodate-periodate-free solution and the wash are then freeze-dried to afford the oxidation product in substantially quantitative yields.

The isonicotinic acid hydrazide used may be prepared acording to the method described in U.S. Pat. 2,830,994, dated Apr. 15, 1958.

The new compounds of the present invention possess anti-influenza properties as evidenced by a standard screening procedure in laboratory animals. This screening procedure is based on the determination of the ability of the particular test compound to protect laboratory animals against death or to reduce pulmonary inflammation caused by influenza virus in mice.

The procedure employed is as follows: mice are selected at random and divided into three groups of ten each, one group for treatment and two groups for control purposes. Twenty-four and two hours prior to infection with influenza virus, mice in the treatment group are injected subcutaneously with the test compound. Thereafter, all test groups are infected intranasally, under light anesthesia, with influenza virus, the challenge being diluted to kill 80 to 100 percent of the control animals. The test compound is then administered twenty-four, forty-eight, seventy-two and ninety-six hours after infection. To determine the amount of protection afforded by the test compound, the mice are observed for twenty-one days and the deaths are noted daily. Parameters used in valuating the effect of the test compound are percentage of survivors and geometric mean survival time. When there are survivors in the control group, the geometric mean survival time is not computed and in its place a Rank T test is performed. This latter test compares the pattern of death among the treated mice with the death pattern in the control groups. Th data is analyzed statistically, the accepted standard of $P<0.05$ is required for significance.

To determine the ability of the test compound to reduce pulmonary inflammation, the procedure followed is identical to the one described above except that all animals are killed ninety-six hours after infection. The extent of lung consolidation is visually noted and rated by a numerical scoring, as follows:

0=No consolidation;
1=25 percent consolidation;
2=50 percent consolidation;
3=75 percent consolidation;
4=100 percent consolidation; and
5=A dead mouse.

The scores for the treated animals are then compared statistically with the scores of the control group. The accepted standard of $P<0.05$ is required for significance.

Typically a compound of the present invention, such as, N-[2-(1,6-dihydro-6-oxo-9H-purin-9-yl) - 3,5 - dihydroxy-6 - (hydroxymethyl)morpholino]isonicotinamide is tested by the above procedure an hereinafter listed in Table I are the results thereof.

Infrared absorption

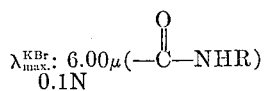

TABLE I

| Pretreatment, mg. | Post treatment, mg. | Total, mg. | Deaths | | | | | | | Death rate | Lung score | Statistical significance | | |
|---|---|---|---|---|---|---|---|---|---|---|---|---|---|---|
| | | | 5th day | 6th day | 7th day | 8th day | 9th day | 10th day | 11th day | | | Survival | Rank T | Average lung core |
| 2x2 | 4x2 | 12 | | | 3 | 1 | 2 | | | 6/10 | 0.5 | (¹) | P<0.05 | P<0.05 |
| Untreated | | | | 3 | 3 | 1 | 1 | | | 8/10 | 1.6 | | | |
| Do | | | 1 | 3 | 3 | | 1 | | 1 | 9/10 | 1.8 | | | |

¹ Not significant.

Since absence of a dose response relationship is a frequent characteristic of antiviral agents, if any dose provides significant protection the substance is active. The above data demonstrates the anti-influenza activity of N - [2 - (1,6 - dihydro - 6 - oxo - 9H - purin - 9-yl)-3,5-dihydroxy - 6 - (hydroxymethyl)morpholino]isonicotinamide and is illustrative of the anti-influenza properties of the compounds of this invention.

The following examples are given by way of illustration and are not to be construed as limitations of this invention, many variations of which are possible without departing from the scope and spirit thereof.

EXAMPLE I

The periodate oxidation product of inosine (5.32 g., 20 mmoles) is wet with 60 ml. of ethanol, dissolved in 200 ml. of water and admixed with isonicotinic acid hydrazide (2.74 g., 20 mmoles). After two-three hours the clear solution begins to deposit fine needle-like crystals and the mixture is shaken to form a solid crystalline mass. The crystals are filtered off, washed with cold water, ethanol, and ether, and dried in vacuo over silica gel to give 5.21 g. of N-[2-(1,6-dihydro-6-oxo-9H-purin-9-yl) - 3,5 - dihydroxy - 6-(hydroxymethyl)morpholino]isonicotinamide trihydrate (57 percent of theory).

The compound is recrystallized from hot water (2.50 g./300 ml.) and after complete air equilibration exhibits the following physical properties.

*Analysis.*—Calcd. for $C_{16}H_{17}N_7O_6 \cdot 3H_2O$ (percent): C, 42.00; H, 5.06; N, 21.44; $H_2O$, 11.82. Found (percent): C, 42.00; H, 5.16; N, 21.12; $H_2O$, 11.94—Abderhalden at 25° C.

and ultraviolet absorption

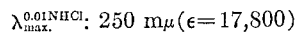

EXAMPLE II

To prepare N-[2-(1,6-dihydro-6-oxo-9H-purin-9-yl)-3, 5 - dihydroxy - 6 - (hydroxymethyl)morpholino] - 2-methyl-isonicotinamide, the periodate oxidation product of inosine is reacted with 2-methylisonicotinic acid hydrazide according to Example I.

*Analysis.*—Calcd. for $C_{17}H_{19}N_7O_6 \cdot H_2O$ (percent): C, 46.9; H, 4.9; N, 22.5; $H_2O$, 4.1. Found (percent): C, 47.2; H, 4.9; N, 22.1; $H_2O$, 4.6—Abderhalden.

In the same manner, N-[2-(1,6-dihydro - 6 - oxo-9H-purin-9-yl)-3,5-dihydroxy - 6 - (hydroxymethyl)morpholino]-5-propylisonicotinamide is prepared.

What is claimed is:

1. N - [2 - (1,6 - dihydro - 6 - oxo - 9H - purin - 9-yl)-3,5-dihydroxy-6 - (hydroxymethyl)morpholino]isonicotinamide.

References Cited

UNITED STATES PATENTS 2,753,353   7/1956   Bernstein et al. _____ 260—260

ALEX MAZEL, Primary Examiner

A. M. TIGHE, Assistant Examiner

U.S. Cl. X.R.

260—252, 295; 424—248